United States Patent [19]

Mullis

[11] Patent Number: 5,510,022
[45] Date of Patent: Apr. 23, 1996

[54] POND AERATOR

[76] Inventor: Jerry W. Mullis, 5337 Coppage Rd., Hahira, Ga. 31632

[21] Appl. No.: 243,262

[22] Filed: May 16, 1994

[51] Int. Cl.$^6$ .................................. C02F 3/02; B01F 3/04
[52] U.S. Cl. .................. 210/170; 417/61; 239/20
[58] Field of Search .................. 417/81; 210/242.25, 210/747, 170; 239/20, 390

[56] References Cited

U.S. PATENT DOCUMENTS

| | | | |
|---|---|---|---|
| 2,974,872 | 3/1961 | Rodman | 239/20 |
| 3,542,292 | 11/1970 | Chase | 239/20 |
| 3,622,074 | 11/1971 | Frohwerk | 417/61 X |
| 3,935,156 | 1/1976 | Richter | 210/242.2 X |
| 4,235,379 | 11/1980 | Beamer | 239/390 X |
| 4,308,137 | 12/1981 | Freeman | 210/242.2 X |
| 4,358,413 | 11/1982 | Brucker | 210/242.2 X |
| 4,426,213 | 1/1984 | Stavropoulos | 239/390 X |
| 4,540,528 | 9/1985 | Haegeman | 417/61 X |
| 5,335,859 | 8/1994 | Thayer | 239/390 |

Primary Examiner—Richard E. Gluck

[57] ABSTRACT

A pond aerator for aerating and circulating water in a body of water comprising a pump having an inlet adapted for receiving water and an outlet adapted for transmitting pumped water; a power transmission mechanism coupled between the pump and an external power source for energizing the pump; a spraying mechanism coupled to the outlet of the pump for generating a variety of spray configurations; a floating mechanism adapted to float on the surface of a body of water; a coupling mechanism coupled between the pump and floating mechanism for keeping the inlet of the pump submerged in a body of water and the spraying mechanism raised above the body of water; an anchor adapted to be positioned at the bottom of a body of water; and an anchor line connected between the anchor and the pump.

1 Claim, 3 Drawing Sheets

POND AERATOR

BACKGROUND OF THE INVENTION

1. Field of the Invention

The present invention relates to a pond aerator and more particularly pertains to aerating and circulating water in a body of water such as a pond, pool, or the like with a pond aerator.

2. Description of the Prior Art

The use of aeration devices is known in the prior art. More specifically, aeration devices heretofore devised and utilized for the purpose of aerating and circulating water are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,030,859 to Henegar discloses a floating aerator having means to vary the length of the draft pipe.

U.S. Pat. No. 4,179,243 to Aide discloses a flotation pump device.

U.S. Pat. No. 4,553,902 to Eberhardt discloses a floating portable pump.

U.S. Pat. No. 4,789,307 to Sloan discloses a floating pump assembly.

U.S. Pat. No. 4,832,013 to Hartdorn discloses a portable underwater breathing apparatus.

U.S. Pat. No. 5,176,503 to Palmer discloses a pond water destratifier.

While these devices fulfill their respective, particular objective and requirements, the aforementioned patents do not describe a pond aerator that uses a floating pump secured to the bottom of a body of water for spraying water for aeration and circulation purposes.

In this respect, the pond aerator according to the present invention substantially departs from the conventional concepts and designs of the prior art, and in doing so provides an apparatus primarily developed for the purpose of aerating and circulating water in a body of later such as a pond, pool, or the like.

Therefore, it can be appreciated that there exists a continuing need for new and improved pond aerator which can be used for aerating and circulating water in a body of water such as a pond, pool, or the like. In this regard, the present invention substantially fulfills this need.

SUMMARY OF THE INVENTION

In the view of the foregoing disadvantages inherent in the known types of aeration devices now present in the prior art, the present invention provides an improved pond aerator. As such, the general purpose of the present invention, which will be described subsequently in greater detail, is to provide a new and improved pond aerator and method which has all the advantages of the prior art and none of the disadvantages.

To attain this, the present invention essentially comprises, in combination, an electric and submersible sump pump having an inlet adapted for receiving water external thereto and an outlet adapted for transmitting pumped water therefrom. An electrical power cable is included and has one end coupled to the sump pump for transmitting energy thereto for pumping and the other end extended from the sump pump and adapted to be connected to an external power source for receiving energy. A rigid spraying tube is included and has a first end coupled to the outlet of the sump pump and a second end extended upwards therefrom. A set of interchangeable spray nozzles is included for generating a variety of spray configurations with a single spray nozzle from the set coupled to the second end of the spraying tube. A bracket assembly is included. The bracket assembly includes two rigid rails perpendicularly disposed across each other and coupled together to define a point of intersection with each rail having symmetrically opposed segments disposed about the point of intersection. Each segment has a tip end, a first intermediate location between the tip end and point of intersection, and a second intermediate location between the tip end and the first intermediate location, a first section laterally extended from the point of intersection to the first intermediate location, a second section upwardly extended from the first intermediate location to the second intermediate location, and a third section upwardly extended in curvature to define an essentially C-shaped and outwardly extended holder section. The bracket assembly includes four hooks with each hook having a bottom end coupled to the first section of a segment of a rail and an upwardly extended and inwardly curved top end adapted to be secured to the sump pump such that the hooks in combination hold the sump pump in a stationary position on the bracket assembly at the point of intersection. The bracket assembly includes four C-shaped and inwardly extended complimentary holder sections, each complimentary holder section coupled to a holder section of the bracket assembly to create a loop. Lastly, the bracket assembly includes an anchor point extended downwards from the point of intersection of the rails. A generally annular and tubular float is included and disposed through and coupled within loops of the bracket assembly with the float adapted for keeping the inlet of the sump pump submerged in a body of water and the nozzle raised above the body of water. An anchor is included and has a generally semi-circular foot at one end, a ring at the other end, and a cylindrical tapered leg extended therebetween with the anchor adapted to be positioned at the bottom of a body of water below the sump pump. Finally, an anchor line is included and has a snap swivel on one end connected to the ring of the anchor and a snap swivel on the other end extended upwards and connected to the anchor point of the bracket assembly for keeping the sump pump from drifting from a given location.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pond aerator which has all the advantages of the prior art aeration devices and none of the disadvantages.

It is another object of the present invention to provide a new and improved pond aerator which may be easily and efficiently manufactured and marketed.

It is a further object of the present invention to provide a new and improved pond aerator which is of durable and reliable construction.

An even further object of the present invention is to provide a new and improved pond aerator which is susceptible of a low cost of manufacture with regard to both materials and labor, and which accordingly is then susceptible of low prices of sale to the consuming public, thereby making such a pond aerator economically available to the buying public.

Still yet another object of the present invention is to provide a new and improved pond aerator which provides in the apparatuses and methods of the prior art some of the advantages thereof, while simultaneously overcoming some of the disadvantages normally associated therewith.

Even still another object of the present invention is to provide a new and improved pond aerator for aerating and circulating water in a body of water such as a pond, pool, or the like.

Lastly, it is an abject of the present invention to provide a new and improved pond aerator comprising a pump having an inlet adapted for receiving water and an outlet adapted for transmitting pumped water; power transmission means coupled to the pump and adapted to be coupled to an external power source for energizing the pump; spraying means coupled to the outlet of the pump for generating a variety of spray configurations; floating means adapted to float on the surface of a body of water; coupling means coupled between the pump and floating means for keeping the inlet of the pump submerged in a body of water and the spraying means raised above the body of water; an anchor adapted to be positioned at the bottom of a body of water; and an anchor line connected between the anchor and the pump.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
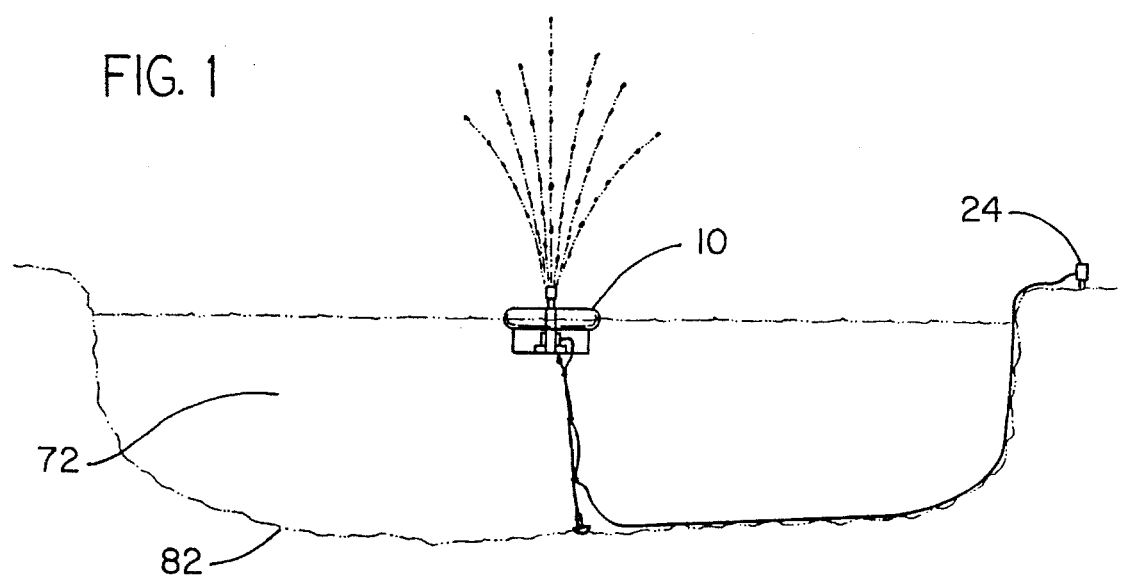
FIG. 1 is a cross-sectional view of the preferred embodiment constructed in accordance with the principles of the present invention.
Figure 2:
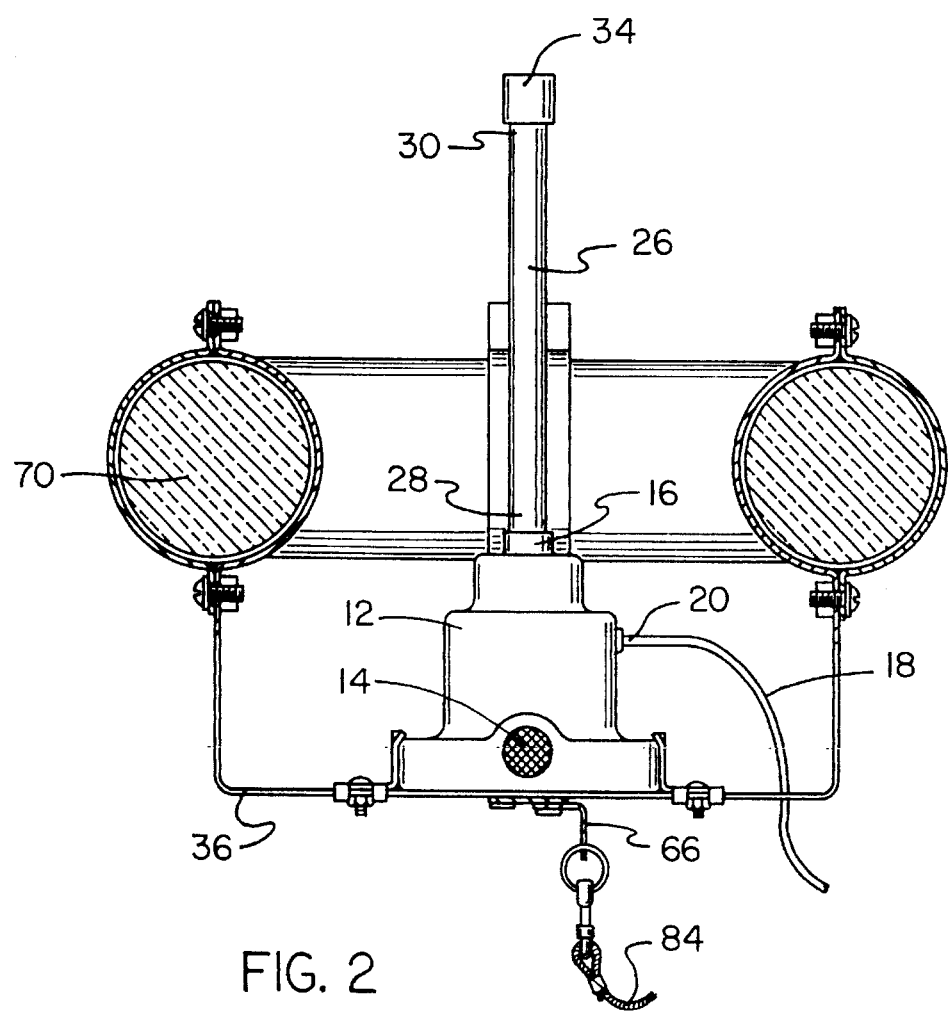
FIG. 2 is a cross-sectional view of the floating components of the present invention of FIG. 1.
Figure 3:
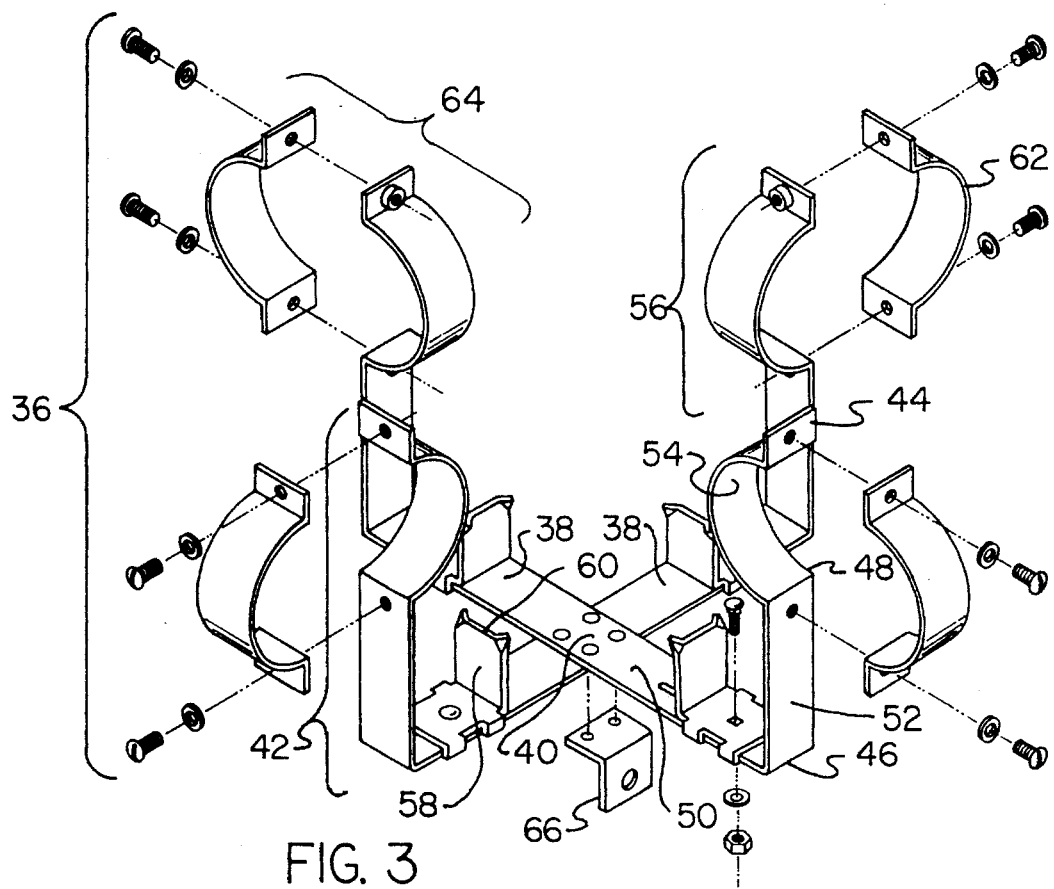
FIG. 3 is an exploded perspective view of the bracket assembly used for holding the sump pump and float.
Figure 4:
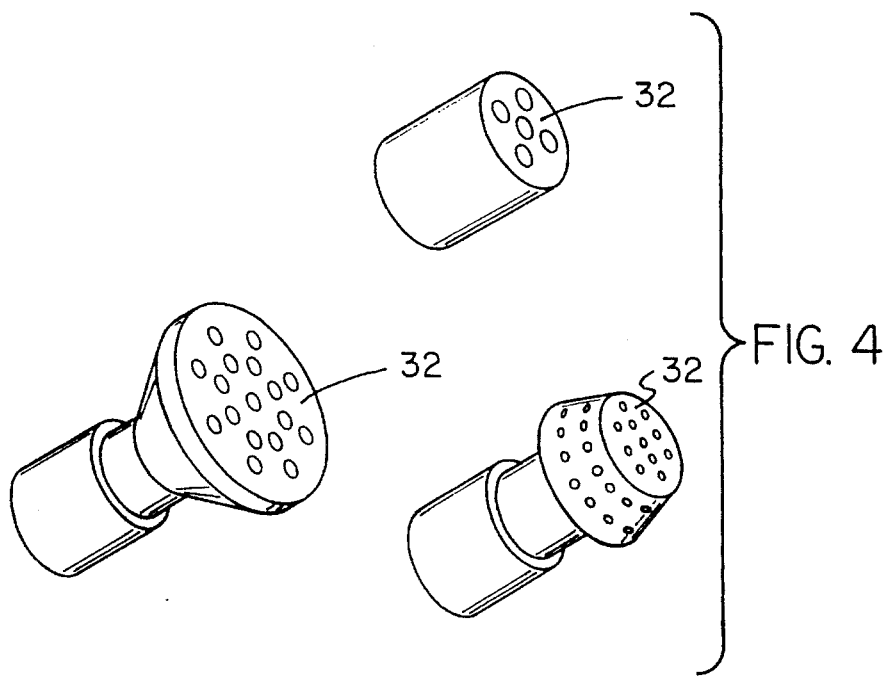
FIG. 4 is a perspective view of the nozzles used for generating a variety of spray configurations.
Figure 5:
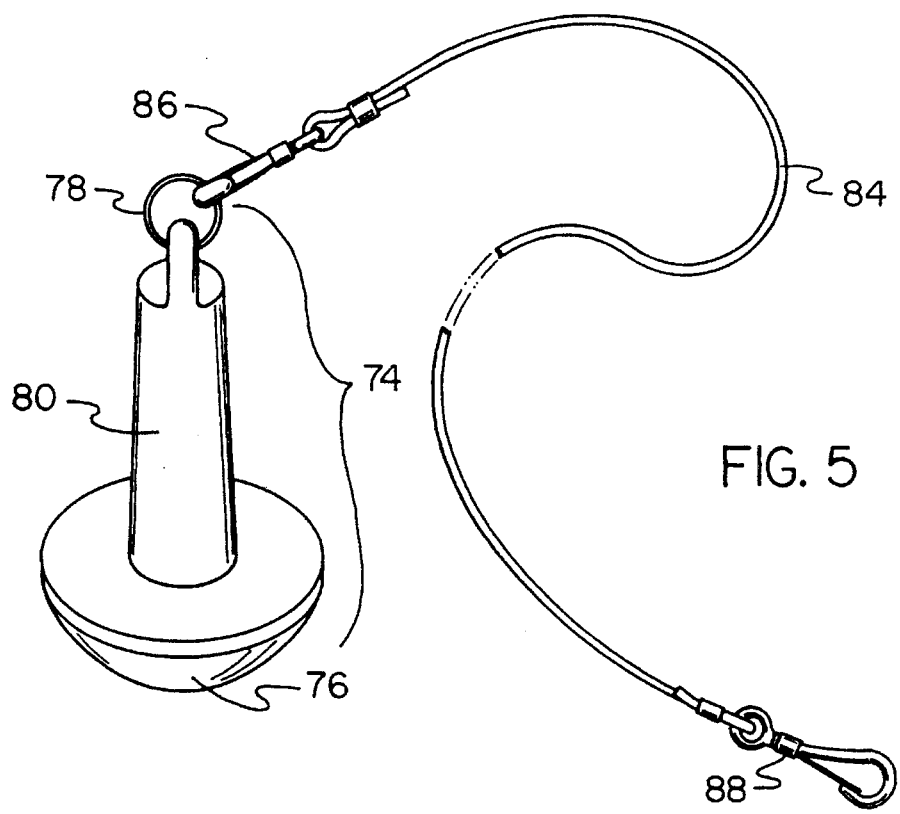
FIG. 5 is a perspective view of the anchor and anchor line of the present invention.
Figure 6:
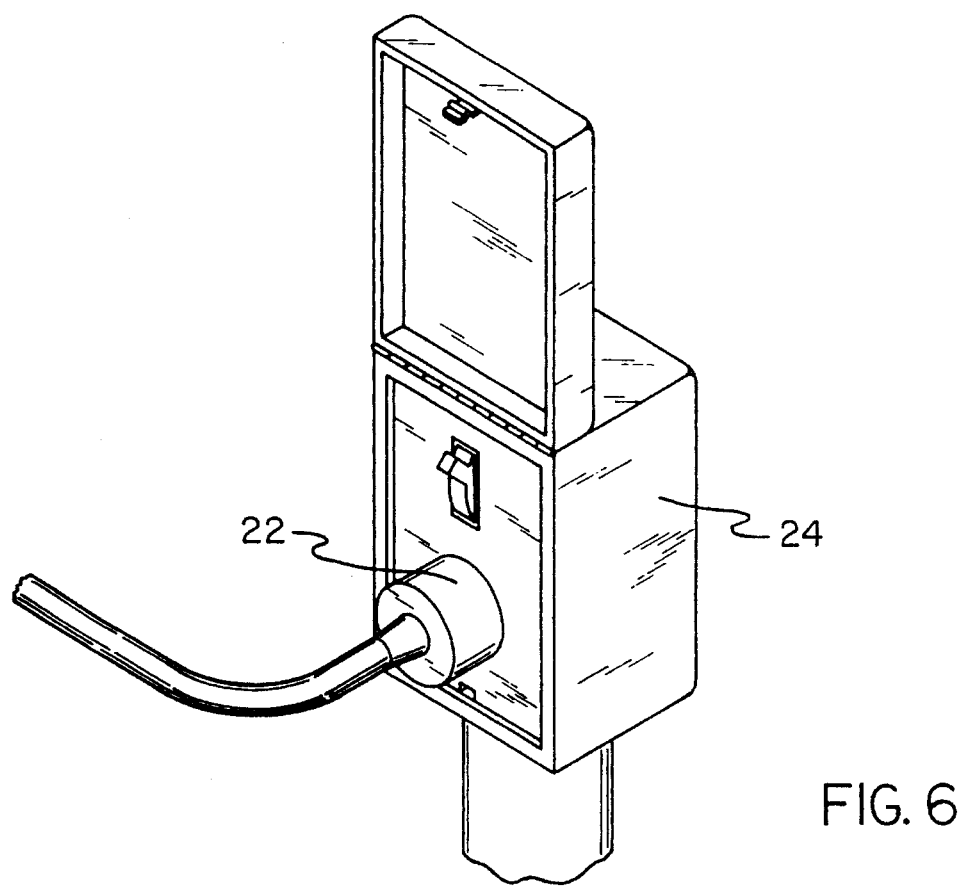
FIG. 6 is a perspective view of the coupling between the electrical power cable of the present invention and the water-proof interface of an external power supply positioned on the bank of the pond as shown in FIG. 1.

With reference now to the drawings, and in particular, to FIG. 1 thereof, the preferred embodiment of the new and improved pond aerator embodying the principles and concepts of the present invention and generally designated by the reference number 10 will be described.

Specifically, the present invention includes eight major components. The major components are the sump pump, power cable, spraying tube, spray nozzles, bracket assembly, float, anchor, and anchor line. These components are interrelated to provide the intended function.

More specifically, it will be noted in the various Figures that the first major component is the sump pump 12. The sump pump is electric and adapted to have a portion thereof submersible in a body of water. The sump pump has an inlet 14 adapted for receiving water. The sump pump also has an outlet 16 adapted for transmitting pumped water therefrom. A variety of different sump pumps may be utilized based on the amount of water circulation and aeration desired.

The second major component is the power cable 18. The power cable is adapted for transmitting electrical power. It has one end 20 coupled to the sump pump 12 for transmitting electrical energy thereto for enabling the pump to operate. The power cable has another end 22 extended from the pump with a plug formed thereon adapted to be connected to an outlet of an external power source 24 positioned near the body of water for receiving electrical energy. The power cable has a sheath of water resistant material disposed thereover to prevent shorts when disposed within the body of water.

The third major component is the spraying tube 26. The spraying tube is rigid and elongated in structure. It has a first end 28 coupled to the outlet 16 of the sump pump. The second end 30 of the spraying tube is extended upwards from the sump pump. It is adapted to receive a spray nozzle therein.

The fourth major component is the spray nozzles. The present invention includes a set 32 of interchangeable spray nozzles. These nozzles are used for generating a variety of spray configurations for generating a variety of different shaped water fountains. A single spray nozzle 34 from the set is coupled to the second end 30 of the spraying tube. The nozzle is chosen based on the amount of circulation desired, aeration desired, and aesthetic look of the water fountain desired.

The fifth major component is the bracket assembly 36. The bracket assembly includes four subcomponents. The subcomponents are the rails, hooks, holder sections, and anchor point. These subcomponents are interrelated to provide the intended function.

The first subcomponent of the bracket assembly is the rails 38. The present invention includes two rigid rails. The rails are perpendicularly disposed across each other and coupled together to define a point of intersection 40. Each rail has symmetrically opposed segments 42 disposed about the point of intersection. Each segment has a tip end 44, a first intermediate location 46 between the tip end and point of intersection, and a second intermediate location 48 between the tip end and the first intermediate location. Each rail is comprised of three sections disposed between the ends and intermediate locations. A first section 50 is laterally extended from the point of intersection 40 to the first intermediate location 46. A second section 52 is upwardly extended from the first intermediate location 46 to the second intermediate location 48. Lastly, a third section 54 is upwardly extended in curvature to define an essentially C-shaped and outwardly extended holder section 56.

The second subcomponent of the bracket assembly is the hooks 58. The present invention includes four hooks. Each hook has a bottom end coupled to the first section 50 of a segment of a rail and an upwardly extended and inwardly curved top end 60 adapted to be secured to the sump pump 12. The hooks in combination hold the sump pump in a stationary position on the bracket assembly 36 at the point of intersection 40. They are positionable along the extent of the first section, thus enabling different types of pumps to be secured therebetween. The hooks are coupled to the first section with a bolt secured with a nut.

The third subcomponent of the bracket assembly is the holder sections 62. The present invention includes four C-shaped and inwardly extended complimentary holder sections. Each complimentary holder section is coupled to a holder section 56 of the bracket assembly 36. This coupling creates four rigid loops 64. The coupling is performed with two bolts each disposed through washers on the upper and lower sides of the loop.

The fourth subcomponent of the bracket assembly is the anchor point 66. The anchor point is coupled to the rails 38 and extended downwards therefrom at the point of intersection 40. The anchor point is adapted to be coupled to an anchor line.

The sixth major component is the float 70. The float is generally annular and tubular in structure. It is disposed through and coupled within the loops 64 of the bracket assembly 36. The float is adapted for keeping the inlet 14 of the sump pump submerged in a body of water 72. The float is also adapted to keep the nozzle 34 raised above the body of water for spraying.

The seventh major component is the anchor 74. The anchor has a generally semi-circular foot 76 at one end. The anchor also has a ring 78 at the other end. A tapered cylindrical leg 80 is extended between the foot and the ring. The anchor is adapted to be held at the surface or in mud at the bottom 82 of a body of water below the sump pump 12.

The eighth major component is the anchor line 84. The anchor line is flexible in structure. It has a snap-swivel 86 on one end connected to the ring 78 of the anchor. It also has a snap-swivel 88 on the other end extended upwards and connected to the anchor point 66 of the bracket assembly. The anchor line is used for keeping the sump pump 12 from drifting from a given location.

Superior results occur when the pump is about two feet beneath the surface of the water. Further, AC or DC motors may readily employed. In situations where a source of AC potential is not readily available, a battery pack could be provided on the bank of the water adjacent to the device.

In the preferred embodiment, the spraying tube and spray nozzles are made of polyvinyl chloride. The spraying tube has about a ¾ inch diameter. The float is made of a foam filled material or a rubber inner tube. The sump pump is conventional is design and commercially available. The bracket assembly is made of plastic or polyvinyl chloride. The anchor line is made of a water resistant rope. The anchor is made of plastic or rubber.

The present invention is placed onto the surface of any pool with a low or non-existent supply of water running into it. The present invention acts to shoot water into the air in a steady geyser-like stream, thus aerating the pond's water. This aeration is designed to clear murky water while providing a more healthy environment for the pond's fish.

The present invention provides several benefits. First, the present invention circulates and aerates water in a pond. Second, the present invention makes algae-clogged or murky water clearer and more attractive to the eye. Third, the present invention improves the health of fish in the pond, thus increasing the likelihood of a higher rate of fish reproduction. Fourth, since the fish are in greater quantity and more vigorous, a better fishing environment is created for sportsmen.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A pond aerator for aerating and circulating water in a body of water comprising, in combination:

an electric and submersible sump pump having an inlet adapted for receiving water external thereto and an outlet adapted for transmitting pumped water therefrom;

an electrical power cable having one end coupled to the sump pump for transmitting energy thereto for pumping and the other end extended from the sump pump and adapted to be connected to an external power source for receiving energy;

a rigid spraying tube having a first end coupled to the outlet of the sump pump and a second end extended upwards therefrom;

a spray nozzle removably coupleable to the second end of the spraying tube for generating a spray configuration;

a bracket assembly further comprising:

two rigid rails perpendicularly disposed across each other and coupled together to define a point of intersection, each rail having symmetrically opposed segments disposed about the point of intersection, each segment having a tip end, a first intermediate location between the tip end and point of intersection, and a second intermediate location between the tip end and the first intermediate location, a first section laterally extended from the point of intersection to the first intermediate location, a second section upwardly extended from the first intermediate location to the second intermediate location, and a third section upwardly extended in curvature to define an essentially C-shaped and outwardly extended holder section;

four hooks, each hook having a bottom end coupled to the first section of a segment of a rail and an upwardly extended and inwardly curved top end adapted to be secured to the sump pump such that the hooks in combination hold the sump pump in a stationary position on the bracket assembly at the point of intersection;

four C-shaped and inwardly extended complimentary holder sections, each complimentary holder section coupled to a holder section of the bracket assembly to create a loop; and an anchor point extended downwards from the point of intersection;

a generally annular and tubular float disposed through and coupled within loops of the bracket assembly with the float adapted for keeping the inlet of the sump pump submerged in a body of water and the nozzle raised above the body of water;

an anchor having a generally semi-circular foot at one end, a ring at the other end, and a tapered cylindrical leg extended therebetween with the anchor adapted to be positioned at the bottom of a body of water below the sump pump; and an anchor line having a snap swivel on one end connected to the ring of the anchor and a snap swivel on the other end extended upwards and connected to the anchor point of the bracket assembly for keeping the sump pump from drifting from a given location.

* * * * *